United States Patent [19]

Parshall

[11] Patent Number: 4,812,695
[45] Date of Patent: Mar. 14, 1989

[54] ANNULAR STATOR CORE CONSTRUCTION

[75] Inventor: Millis V. Parshall, Erie, Pa.

[73] Assignee: Marathon Electric Manufacturing Corporation, Wausau, Wis.

[21] Appl. No.: 897,132

[22] Filed: Aug. 15, 1986

[51] Int. Cl.$^4$ .............................................. H02K 1/12
[52] U.S. Cl. .................................... 310/258; 310/185; 310/218; 310/214
[58] Field of Search ................................ 310/216–218, 310/254–259, 42, 194, 214, 269, 186, 45, 179, 185; 336/196, 197, 198

[56] References Cited

U.S. PATENT DOCUMENTS

| | | | |
|---|---|---|---|
| 416,240 | 12/1889 | Schmid | 310/258 |
| 784,032 | 3/1906 | Burke | 310/216 |
| 880,429 | 2/1908 | Treat | 310/214 |
| 1,426,923 | 8/1922 | Steck | 320/12 |
| 2,464,320 | 3/1979 | Klinkhammer | 310/216 X |
| 2,499,326 | 2/1950 | O'Brien | 310/42 X |
| 2,777,080 | 1/1957 | Kitzmiller | 310/185 |
| 2,907,904 | 10/1959 | Carpenter | 310/166 |
| 2,981,856 | 4/1961 | Ludemann et al. | 310/216 X |
| 3,007,068 | 10/1961 | Arnold et al. | 310/172 |
| 3,062,978 | 11/1962 | Smith | 310/166 |
| 3,447,112 | 5/1969 | Broverman et al. | 336/197 |
| 3,600,618 | 8/1971 | Nicholas et al. | 310/216 |
| 3,809,938 | 5/1974 | Sipberg | 310/218 X |
| 4,209,719 | 6/1980 | Schädlich | 310/42 |
| 4,363,987 | 12/1982 | Vorotyntseva | 310/216 |
| 4,433,472 | 2/1984 | Andoh | 310/186 X |
| 4,480,203 | 10/1984 | Takura | 310/42 |

FOREIGN PATENT DOCUMENTS 0142520  11/1979  Japan .................................... 336/197

Primary Examiner—Patrick R. Salce
Assistant Examiner—Judson H. Jones
Attorney, Agent, or Firm—Andrus, Sceales, Starke & Sawall

[57] ABSTRACT

A generator exciter for an A.C. sychronous alternator has a rotor secured to the alternator shaft and a compact high power stator. The stator core is a square laminated core. Eight straight sided poles terminate in a concave end defining a circular rotor opening. A first set of four poles is circumferentially spaced to the diametrical four sides of the core. The poles are a minimum length, and of a width approximately equal to twice the depth of the outer square side portions. A second set of four poles are located at the four corners of the core. The second poles are the same width as the first poles but are significantly longer. Each square corner portion significantly enlarges the outer connecting portion and includes a core mounting opening. Precision prewound coils of the same width and of a length slightly less than the pole length are placed on each pole. A generally stepped construction with a slight enlargement between adjacent poles defines recesses of the width of the coils. The opposed side walls of the poles having a notch adjacent the outer ends. Locking wedges interposed between the poles having locking edges in the opposed notches and curve inwardly into clamping engagement with the two adjacent coil ends.

3 Claims, 2 Drawing Sheets

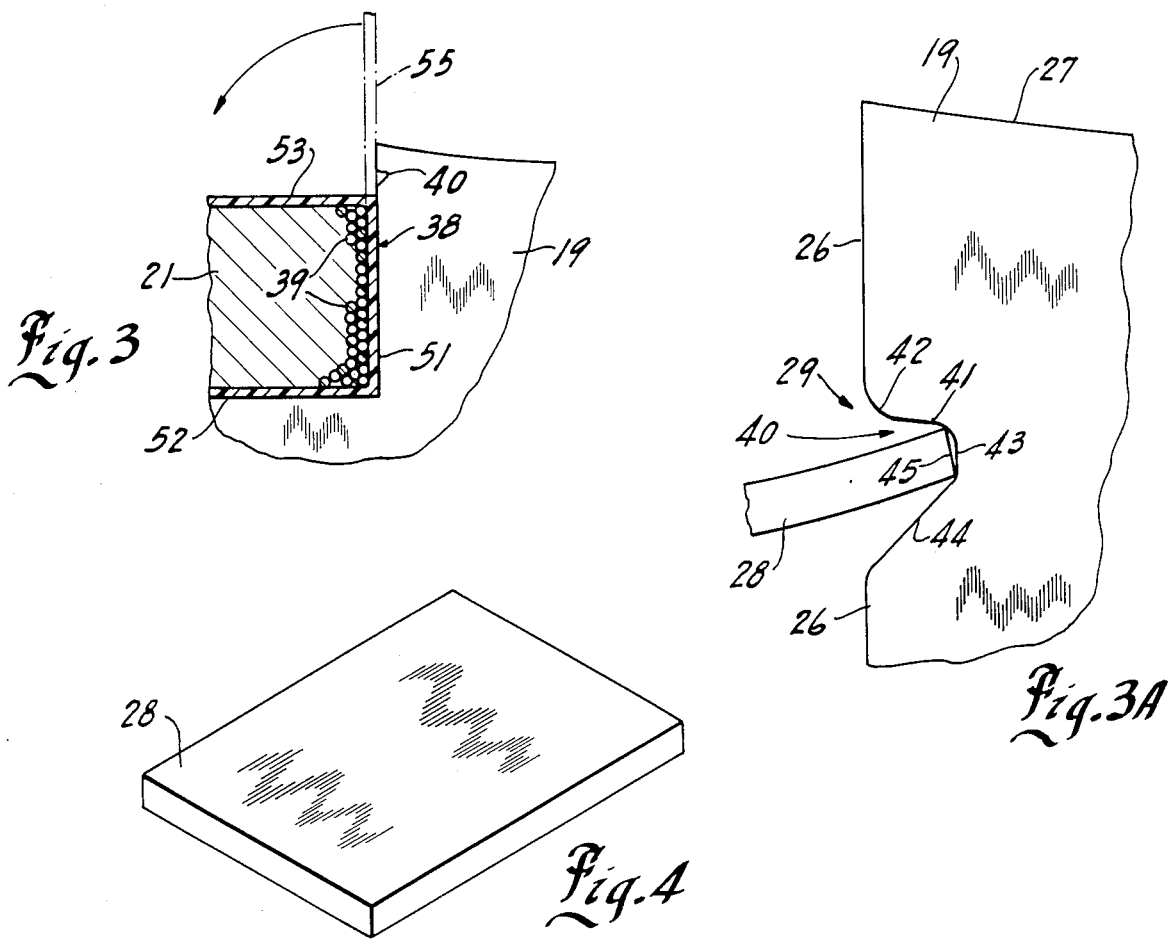
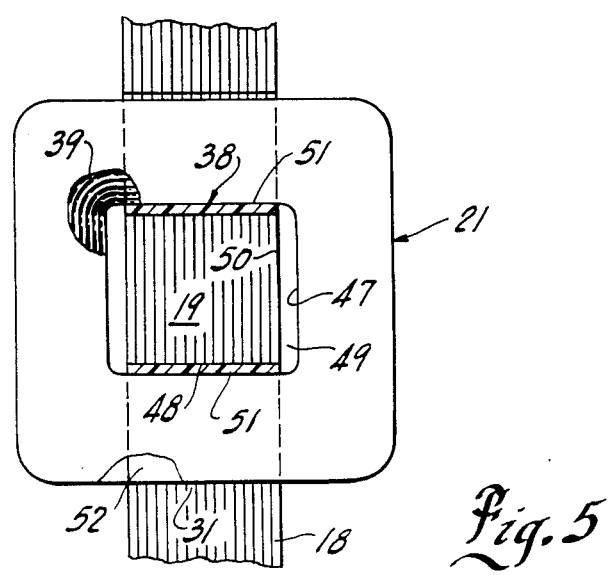

ANNULAR STATOR CORE CONSTRUCTION

BACKGROUND OF THE PRESENT INVENTION

This invention relates to an annular stator core construction and particularly an annular stator core for a multiple pole exciter stator of the exciter for energizing an A.C. synchronous alternator.

The stator of an exciter for an A. C. alternator is formed with special mounting as an integrated assembly with the A. C. synchronous generator. The environmental and usage conditions require a solid rigid mounting of the stator. In the construction of the an integrated assembly, the exciter is preferably a small compact unit. The exciter generally should be such as to produce maximum power output, which requires maximum electrical and magnetic efficiency. Generally, the stators are formed as an annular member having internal coil supporting poles. The poles are formed with outer coil retaining heads, or tooth tips and the coils are wound in a more or less random manner directly on the poles. The laminated stator core is mounted within a supporting frame structure such as a conventional round frame or directly mounted to a supporting bracket.

U.S. Pat. No. 2,777,080 which issued Jan. 8, 1957 discloses a rectangular core structure having a pair of short poles to one side of the rectangular core and relatively long poles to the opposite major side of the rectangular core. Inner corner poles are located between the short and long side poles, each having a length essentially corresponding to that of the long side poles on the major axis of the rectangular core. The poles are similarly formed with well known integral coil retaining heads, requiring winding of the coil onto the poles in accordance with generally accepted present day commercial day practice.

U.S. Pat. No. 1,426,923 which issued Aug. 22, 1922 diagrammatically illustrates a somewhat similar construction with a plurality of equal length poles circumferentially distributed about an annular support. The poles have straight side and the structure for retaining the coils in place is not shown.

U.S. Pat. No. 2,907,904 which issued Oct. 6, 1959 discloses a circular core having a plurality of circumferentially distributed poles including relatively wide poles and narrow poles located between the wide poles. The poles are shortened slightly by chordal portions formed in the outer core portion adjacent the wide poles. The wide poles are formed with integral coil retaining heads for retaining of the wound coils while the relatively thin interpoles are shown with a constant cross section and special encircling retaining devices on each of the small poles to hold the coils. The adjacent poles have side groove portions to receive bridging magnetic members.

The prior art thus has provided a significant number of different types of pole construction for annular stator units with various means for locking of the coils onto the poles.

Although various systems have been provided, there is a need for a compact, high power exciter for optimum integration with an A.C. sychronous generator set and the like.

SUMMARY OF PRESENT INVENTION

The present invention is particularly directed to a compact high powered stator construction particularly adapted for and forming a part of a generator exciter for operating of an A.C. sychronous alternator or like equipment. Generally in accordance with the teaching of the present invention, the exciter core is made as a subtantially rectangular and particularly square core structure. The core is a laminated structure formed of a plurality of like laminations. The core and square laminations have a circular inner opening with radial poles projecting inwardly from the periphery of the opening. Each of the poles is a straight sided pole member terminating at the inner end in a concave curved surface defining a circular opening for mating with a rotating rotor.

First and second sets of radial poles are integrally formed on the inner edge of each lamination to define correspondingly located and shaped poles in the laminated core. In accordance with the teaching of the present invention, the several poles are formed with the straight side walls terminating in the outer edges and having radial end surfaces for close coupling to the rotor. The first set of poles are circumferentially spaced about the lamination and core on the diametrical four sides of the square lamination. The first poles are all of the same length located to permit formation of a pole of minimum length with a generally minimum depth of the annular outer square portion for appropriate distribution of the flux through the pole. The second or alternate pole set includes a like number of poles interposed one each between the adjacent poles of the first set and particularly located at the four corners of the core. The second poles are formed with the same width as the first poles but with significantly longer length. The interposed longer poles are interconnected to the annular outer square portion by significantly enlarged connecting corner portions, which further include mounting openings for fixed mounting of the core by a suitable bracket. In accordance with the present invention, the coils are precision prewound coils with a configuration closely matching the pole diameter construction and length. The precision prewound coils are telescoped onto the poles from within the inner stator core opening and suitable locked onto the poles by any suitable means. In accordance with a preferred and practical construction, the interconnection between the long poles and short poles includes a generally stepped construction with a slight enlargement between adjacent long poles defining recesses adjacent the several poles of width slightly greater than that of the coil to accomodate the precision wound coils abutting the annular portion adjacent the pole. The opposed side walls or edges of the straight sided poles of the laminated core are formed with similar side notches such as a triangular notch. A particular notch used included a flat edge extending normally to the principal plane of the lamination and an inclined edge which projects radially and laterally outwardly from the base of the first edge. The notches are similarly located in the poles in accordance with the radially inner most location of the individual coils. Locking wedges of a suitable insulating material are interposed between the adjacent poles, with the locking edges located in the opposed notches on the sides of adjacent poles and with the wedge shaped to engage the end surfaces of each of the two adjacent coils.

The integral multiple length pole sets in combination with the straight side wall to receive precision wound coils provides an exciter stator fabrication and assembly with a significant improvement in the magnetic characteristic of the core as a result of the construction of the poles, and the use of precision prewound coils.

BRIEF DESCRIPTION OF DRAWINGS

The drawings furnished herewith generally illustrate the best mode presently contemplated for the invention and is described hereinafter.

In the drawings:

FIG. 3 is an enlarged fragmentary view of a stator coil section illustrating a precision wound coil shown in FIGS. 1 and 2;

FIG. 3A is an enlarged fragmentary view of the pole tip illustrating a coil locking unit;

FIG. 4 is a pictorial view of a coil retaining insulator shown in FIGS. 2 and 3a; and FIG. 5 is a fragmentary cross-sectional view through a pole and coil shown in FIG. 2.

DESCRIPTION OF THE ILLUSTRATED EMBODIMENT

Figure 1:
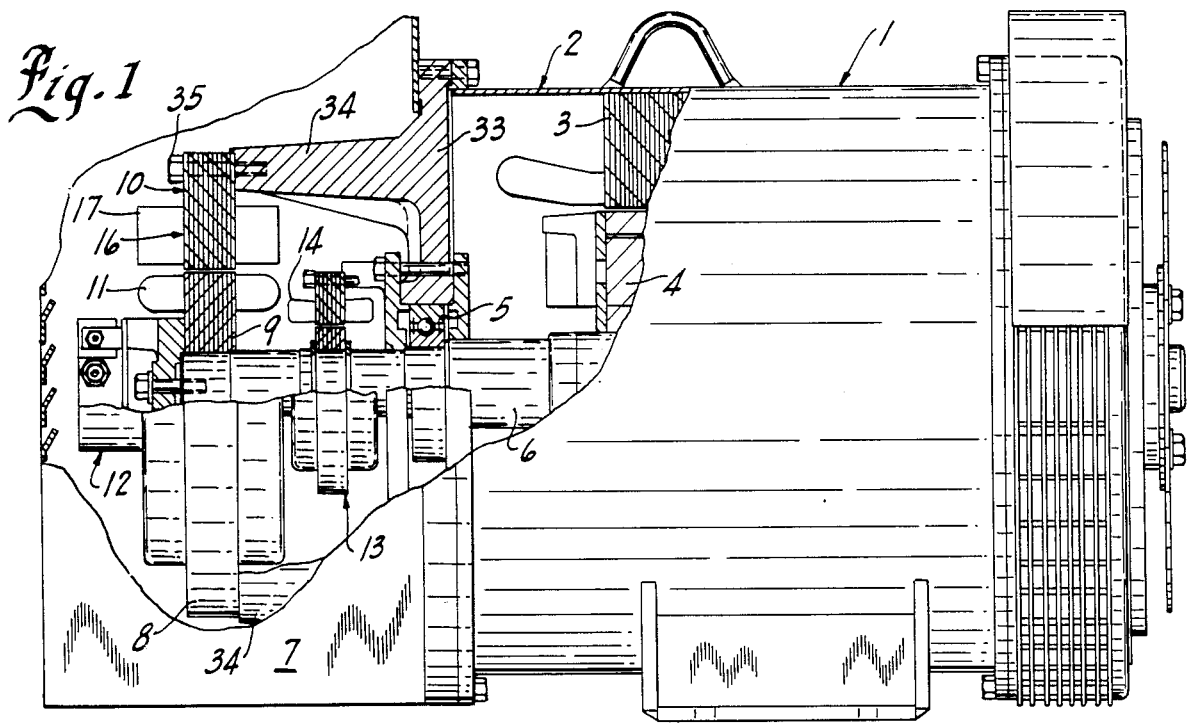
FIG. 1 is a view of an A.C. alternator and integrated exciter with a stator core constructed in accordance with this invention.

Referring to the drawing and particularly to FIG. 1, an alternator 1 as illustrated is adapted to be driven from an internal combustion engine or other suitable prime mover, not shown. The alternator unit includes a main power alternator 2 adapted to generate commercially usable power, such as a three phase 480 volt output for example, for energizing of electrical devices, such as motors, heating units and other high power loads. The alternator 2 is a rotating field alternator having a stationary stator 3 with a rotating field rotor 4 rotatably mounted therein in a suitable precision bearing 5. The opposite end of the shaft is connected to an engine flywheel of a suitable internal combustion engine, not shown, in accordance with known construction. The structure 1 may also be of a two-bearing construction. The one end of the rotor shaft 6 extends outwardly of the bearing 5 and terminates within a control box or housing 7. The rotating field 4 of the alternator 2 is energized from an generator exciter unit 8 secured to the outer end of the alternator shaft 6. The exciter unit 8 includes a rotor 9 fixed to the alternator shaft 6 for rotation within an outer stator unit 10 with the rotating of the field unit 4. The exciter output winding 11 wound on rotor 9 is connected to a full wave rectifier circuit board unit 12 secured to the outer end of the shaft for simultaneous rotation with the rotor.

A permanent magnet generator 13 is mounted between the exciter 8 and the main alternator bearing 5 and includes a generator winding 14 connected to power the exciter 8 through a suitable voltage regulator; for example, as shown in the copending application of A. McFarlane entitled "Alternator Voltage Regulator With Speed Responsive Control", filed on even date herewith.

The present invention is directed to the construction of the exciter unit 8 with a specially formed stator unit 10 constructed as a compact unit, and providing maximum power output. The illustrated stator unit 10 is particularly constructed with a special 8-pole stator core 16 and coil units 17 for application of the exciter 8 for the alternator unit 2 of FIG. 1 for generating an output alternating current, which after rectification, is impressed on a rotating field 4 of the alternator 2 for controlling the output thereof. Generally, the stator core may be formed with multiples of 4 poles.

Figure 2:
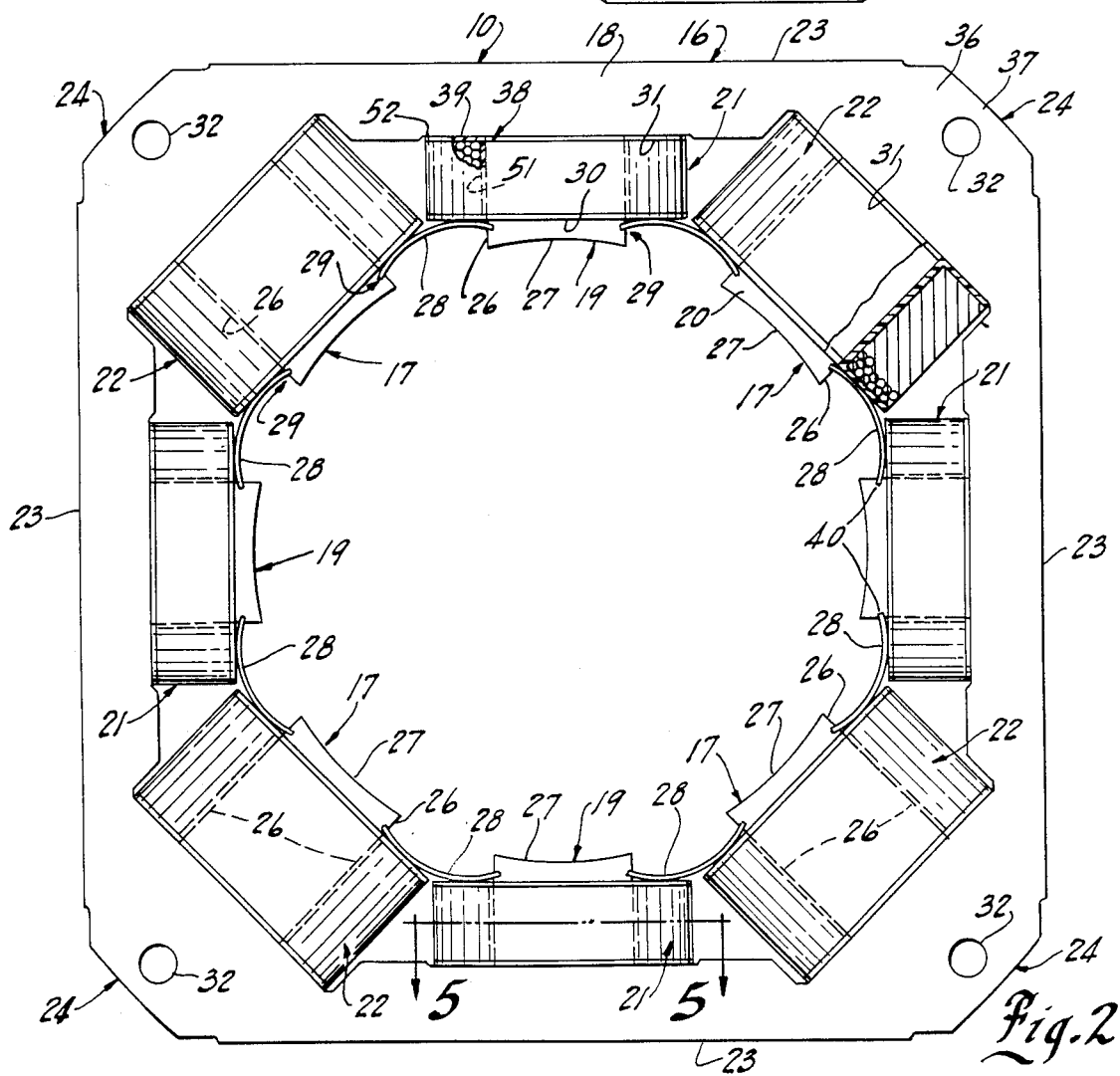
FIG. 2 is a side elevational view of a multiple pole stator unit incorporating the core and coil structure of the present invention, with parts broken away and sectioned to show certain detail of construction.

Referring to the drawing and particularly to FIG. 2, an eight pole stator core 16 is shown with an annular form within which the plurality of circumferentially distributed field coil units 17 are located.

The illustrated stator core 16 is square and includes a generally outer continuous and encircling square periphery portion 18 with a plurality of radially inwardly extending poles 19 and 20 of coil units 17.

The core 16 is a laminated core, as shown in FIG. 1 and formed of a plurality of individual thin laminations such as shown in FIG. 1. Each lamination is a square member having four equal sides corresponding to the final configuration of core 16. A separate precision prewound coil 21 and 22 is secured respectively to each of the poles 19 and 20.

The stator coil units 17 are formed with a first coil set consisting of essentially identical radially inwardly extending poles 19 on which the first set of interconnected coils 21 are located. A second coil set includes the second set of poles 20 interposed between the first pole set with a second set of interconnected coils 22 secured on the poles 20.

The first coil set has the poles 19 located on the center of each side 23 of the outer encircling portion 18. The second coil set is located on the four corners 24 of the core.

The poles 19 and 20 are similarly formed of a rectangular cross-section having straight side walls 26 as well as end faces and which extend out to a concave peripheral surface 27. The preformed coils 21 and 22 as shown in FIG. 2 are inserted onto the poles 19 and 20 from the curved outer ends 27 of the poles 19 and 20. The coils 21 and 22 are precision prewound and provide maximum coil turns per unit of the cross-section.

The coils 21 and 22 are held in place by clamp members 28 inserted between the adjacent poles 19 and 20 and coupled to the adjacent side walls 26 of poles as at 29. The clamp member 28 is a bridging member and abuts the outer end walls or faces 30 of the adjacent coils 21 and 22 and securely holds the coils abutting the inner base portions 31 of the encircling portions 18. The clamp members 28 are designed and constructed to a plurality of clamp members may be used for ease of assembly with or without gaps between them securely hold the coils 21-22 in place.

The stator unit 10 is particularly adapted to be mounted as an integrated element of the A.C. alternator assembly shown in FIG. 1. The square configuration defines enlarged corners 24. The outer periphery of the corners are removed to define angle surfaces as shown. A mounting opening 32 is formed in each corner 24, and the stator unit 10 is mounted as shown in FIG. 2. The frame 33 of the alternator 2 includes a plurality of mounting arms 34 which project axially outwardly in the spaced orientation of openings 32. The core 16 is bolted to the ends of the arms 34 by bolts 35 to firmly mount the stator unit 10 in operative place.

More particularly, referring to one of the illustrated coil units 17 consisting of the pole 19 and coil 21, the pole 19 projects inwardly on a diametrical center line from the flat side of the peripheral portion 18. The pole 19 is centered on the side and extends inwardly from a generally linear portion 18 to the outer curved and concave pole end surface 27. The poles 19 are relatively short poles.

The precision coil 21 closely fits over the pole 19. A U-shaped insulating member 38 is assembled on the pole 19 before the coil 21 is assembled as shown in FIGS. 2 and 3 and the coil 21 is then placed onto the pole. The insulator 38 extends between the surfaces of the coil and the adjacent otherwise abutting surfaces or walls of the core. Thus, coil 21 is formed with a plurality of turns of relatively small diameter wire having an outer insulating varnish coating or the like. The precision winding of the coil 21 provides close abutment of the coil turns and over-lapping of the wire strands within the adjacent recesses defined by the touching round wire, as shown in FIG. 3. The precision winding of the coil 21 increases the copper in a given coil cross-section and typically will increase the copper by a factor of from 75 per cent to 95 per cent of the winding volume or available winding space. This produces a high efficiency electrical coil. As used in this patent application, precision wound coils are thus defined as coils having the coil turns wound in close special abuttment and with the individual coil turn substantially filling all the adjacent recesses formed by the respective round conductors. The special winding apparatus is readily available and no description or illustration thereof is given herein. The apparatus does require the separate prewinding and forming of the coil within the winding apparatus and therefore requires separate attachment to the pole members. The straight sided pole 19 of the present invention readily adapts the present construction to receiving the precision round coils 21.

The preformed coil 21 is placed onto the insulated pole 19 and is secured in place by the common bridging members 28 with the adjacent coil 22. Clamping notches 40 (FIG. 3A) are formed on the diametrically opposite side walls 26 of pole 19. Each notch 40 is essentially identically constructed as illustrated. Generally, the groove or clamping notch 40 is formed as a U-shaped notch having an outer slightly inclined wall 41 connected to the outer side wall 26 by a curved connection 42. The groove includes an inner flat base 43 generally of a thickness to accommodate corresponding to the thickness of the clamp member. The radially outer wall 44 of the groove 40 is inclined outwardly and circumferentially to the side wall 26 joined thereto by a small radius. Thus the notch or groove 40 defines a laterally opening notch within which the edge 45 of the clamp member 28 is located, and engages adjacent coils 21 and 22 to hold them in place as hereinafter described.

The adjacent coil units 17 consisting of poles 20 and coils 22 are longer but have the same width. This is readily permitted by the enlarged area provided in the corner of the square laminations and core. Thus the corner portions 36 of the peripheral portion 18 are constructed with a substantially significant greater depth from the outer removed corner surfaces 37 to the pole 20. The pole 20 projects inwardly from such enlarged portion with a concave inner face 27 which is located on a common circle with the corresponding faces 27 of the poles 19. Coils 22 are similarly constructed as precision wound coils with the conductor wire 39. Coil 22 again is wound with a cross-section to closely mate and fit to the pole 20 and preferably formed with a rectangular cross-section. As shown, the depth or length of the coils 22 is somewhat less than the depth of the poles 20, generally by the same distance as the difference provided between poles 19 and the associated coils 21.

This locates the outer face 30 of coils 22 in similar relation to a locking notch 40 provided in the side wall 26 of poles 20. The coil end face 30 is thus spaced a short distance from the outermost curved surface of the pole 19.

The clamp member 28 is a formed of a substantially rigid material having limited flexibility. The member is preferably formed of a suitable material such as fiberglass laminate, and is conveniently formed as a flat strip which flexes to the clamping position. The normal width of the clamp member 28 is in excess of the circumferential spacing of the grooves 40 between the immediately adjacent poles 19 and 20. The clamp member 28 is inserted into the gap between the poles 19 and 20, after the assembly of the coils 21 and 22. The member 28 deforms slightly forming the illustrated concave shape and moves into the grooves 40, with the opposite edges 45 then snapping inwardly into the grooves 40. With the concave configuration and operation with the specially formed grooves 40, the edge 45 of the clamp member 28 engages and abuts the base 43 of the groove. The clamp member curves outwardly and extends circumferentially and radially outwardly along the inner base wall 44 into clamping engagement with the adjacent end face 30 of the coils 21 and 22. The clamp member 28 is such as to make and maintain the desired firm hold and support of the coils onto the corresponding pole.

In a preferred construction, the coils are prewound, the insulator is assembled to the pole and the coil then inserted and clamped securely in place.

Referring particularly to FIGS. 3–5, the construction and assembly of the preformed coil 21 with relationship to the pole 19 is illustrated in a preferred construction. The precision prewound coil 21 is formed as a generally rectangular coil having slightly rounded corners. The inner opening 47 of the coil 21 has a circumferential width essentially equal to the width of the pole 19. The axial length of the coil opening is somewhat longer than the axial length of the stator pole 19. In the assembled relation, the coil 21 thus fits closely over the circumferential faces 48 or walls of the pole 19, with the axial ends projecting equally outwardly and defining air cooling air gap or passages 49 between the axial pole faces or walls 50 and the coils.

Thin insulator members 38 are interposed between the abutting surfaces of the stator core and the adjacent coil sides. In particular, similar insulation paper members 51 are provided to the opposite walls 48 of each pole. Referring particularly to FIG. 3, the insulator member 51 is formed of a suitable conventional pole insulation material and is interposed between the pole face and the adjacent coil side to insulate the coil wire from the steel pole. A similar insulating member 52 is interposed between the base of the coil recess 31 and the adjacent axial end face of the coil 21. A similar sheet or member 53 is secured overlying the outer end face of the coil to pretect the insulated wires and provide a bearing surface for the coil securing clamp member 28.

In practice, the coil 21 is prewound of a suitable varnished or similarly insulated wire. The insulator 38 is formed from a single sheet which is readily bent into the U-shaped configuration to lie against the three faces of the coil. In assembly, the insulator sheet 38 is inserted as an L-shaped member abutting the recess with the base and the end face of the pole and with the exterior insulation projecting outwardly substantially in the plane of the pole as at 55, shown in FIG. 3. A precision, prewound coil 21 is placed on the insulated pole 19 and the extended end insulation 55 folded into abutting engagement with the coil 21 to form member 53. The clamp members 28 are inserted between the poles 19 and resiliently deform inwardly into firm clamping engagement with the end face insulating member 53 of the coil 21 to firmly clamp and hold the coil 21 in position.

Although pole 19 is shown square in FIG. 5, the poles will be rectangular when the axial length is more than or less then the circumferential width of the pole.

The stator unit constructed as shown and described provides an electrically and magnetically efficient stator unit, thereby permitting maximum electrical output for a given size. The unequal length of the poles in the 8 pole configuration establishes maximum usage of the active magnetic material in the square lamination. This establishes high magnetic efficiency and a minimum cost and size of the core for a given exciter designed output. The precision coils in combination with the straight walled poles establishes maximum electrical coil turns per given slot size. This provides the minimal coil cost for a minimum coil size for a corresponding required electrical output of the exciter.

For example, in a practical exciter stator construction for sychronous A.C. alternator assembly such as generally shown in FIG. 1, a stator lamination and core was designed having the following substantial dimensions. The width across the flats was 15 inches with a rotor opening of 9.750 inches. The stator stack had a depth of 2.40 inches. A number 16 guage single strand wire was precision wound with an average of 573 turns per coil for the two coil set. The two coils were formed with similar number of layer and a different number of turns per layer. The small coil is formed of 480 turns with 30 turns per layer including 30 turns on the outermost top layer. The larger coil is similarly precision wound with 666 turns with 43 turns per layer and with 21 turns on the outermost layer.

The exciter was readily used for various sizes of alternators and particularly practical commercial implementation.

Various modes of carrying out the invention are comtemplated as being within the scope of the following claims particularly pointing out and distinctly claiming the subject matter which is regarded as the invention.

I claim:

1. A eight pole stator unit for an eight pole A.C. generator, comprising a stacked laminated core including a plurality of essentially identical one-piece lamination having a substantially square outer configuration and an inner circular opening defined by a plurality of circumferentially integral magnetic poles, said poles being joined by an encircling substantially square peripheral base, said poles including a first set of four poles located one each of the center of each side of said square core, said poles being essentially identically constructed and projecting inwardly from the peripheral base and having an inner circular face forming a common circle, said poles being formed with circumferentially located straight side walls and straight axial end walls throughout the total length of the poles to provide unobstructed movement over the poles, a precision wound coil located on said pole, said precision wound coil mating with said pole and having a total depth less than the total length of said pole, a second set of four poles located one each centrally between the adjacent first poles and each having a cross-section essentially the same as said first poles, and said second poles being essentially identically constructed and being substantially longer than said first poles and having an inner circular face, said poles extending from said corner portions of said core and projecting inwardly from said base with the inner face terminating on the common circle with said first poles, said second poles having circumferentially located straight side walls and straight axial end walls to allow unobstructed movement of a precision coil over said pole, second precision wound coils having an axial length corresponding to slightly less than the length of the second pole, said second coils being telescoped and placed over said second poles abutting the peripheral base and with the outer end face spaced inwardly form the end of the corresponding core, electrical insulation between said poles and abutting the sidewalls of each pole, each of said coils having a central opening with circumferentially spaced sidewalls abutting the insulation and axial end walls spaced from said axial walls of the pole to form vented turns for each said coil, bridging clamp members formed of stiff flexible material and interposed between the adjacent poles and having end edges engaging the sides of the immediately adjacent poles, and said clamp members engaging the outer end faces of the coils and serving to firmly clamp the coil onto the poles with the opposite end face of the coil abutting the peripheral base.

2. The apparatus of claim 1 wherein said side walls of said poles include grooves aligned with each clamp member, each groove having a radially inner circumferential wall extending substantially circumferentially of the core, said grooves having a flat generally radial base and an outer inclined wall, said clamp members having an end edge thickness generally corresponding to the depth of the groove base, said clamp members having a length slightly greater than the circumferential length between the grooves and adjacent pole sides, said clamp members being disposed with the opposite longitudinal edges engaging the respective said groove and resiliently engaging the end faces of the corresponding coils to clamp the coil onto the pole abutting the base of the peripheral portion, said coils having a similar width and substantially different lengths, said outer peripheral base is formed with inner stepped surfaces between the adjacent poles, said stepped surface including a generally centrally located inner projecting ridge portion defining substantially shallow recess portions to the opposite side thereof, said recess portions having a flat inner base portion and an outer side wall substantially parallel to said poles.

3. The apparatus of claim 1 wherein the side walls of each of said poles having a similar formed groove, said groove being spaced inwardly from the outer end of the poles and outwardly of the outer end face of the coil on the corresponding pole, said clamp members having said end edges located in said grooves.

* * * * *

UNITED STATES PATENT AND TRADEMARK OFFICE
CERTIFICATE OF CORRECTION

PATENT NO. : 4,812,695

DATED : March 14, 1989

INVENTOR(S) : Millis V. Parshall

It is certified that error appears in the above-identified patent and that said Letters Patent is hereby corrected as shown below:

Col. 8, line 19, claim 1: delete "form" and substitute therefor ---from---; Col. 8, line 31, claim 1: delete "poles" and substitute therefor ---pole---

Signed and Sealed this

Twenty-eighth Day of November 1989

*Attest:*

JEFFREY M. SAMUELS

*Attesting Officer*     Acting Commissioner of Patents and Trademarks